(12) United States Patent
Reichert et al.

(10) Patent No.: US 10,748,720 B2
(45) Date of Patent: Aug. 18, 2020

(54) CONNECTION DEVICE AND METHOD FOR ELECTRICALLY CONNECTING AN ELECTRIC MOTOR TO AN ELECTRONIC SWITCHING UNIT, ELECTRONIC SWITCHING UNIT, CONNECTION UNIT AND DEVICE SYSTEM WITH AT LEAST ONE CONNECTION DEVICE

(71) Applicant: ZF Friedrichshafen AG, Friedrichshafen (DE)

(72) Inventors: Heinz Reichert, Markdorf (DE); Michael Kohr, Bodnegg (DE); Nicolas Schreibmüller, Meckenbeuren (DE); Christian Brückner, Rimpar (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/118,132

(22) Filed: Aug. 30, 2018

(65) Prior Publication Data
US 2019/0074147 A1    Mar. 7, 2019

(30) Foreign Application Priority Data
Sep. 7, 2017    (DE) .......................... 10 2017 215 729

(51) Int. Cl.
*H01H 9/54* (2006.01)
*H02M 7/00* (2006.01)
(Continued)

(52) U.S. Cl.
CPC .............. *H01H 9/541* (2013.01); *H02H 3/08* (2013.01); *H02M 7/003* (2013.01); *H02P 3/22* (2013.01); *H02P 27/06* (2013.01)

(58) Field of Classification Search
CPC ......... H01H 9/541; H02H 3/08; H02M 7/003; H02P 27/06; H02P 3/22
See application file for complete search history.

(56) References Cited

U.S. PATENT DOCUMENTS

2007/0053142 A1* 3/2007 Allen .................. H01H 9/0264
                                                                361/647
2009/0040673 A1* 2/2009 Maigret ................. H01H 89/06
                                                                361/63
2014/0313621 A1* 10/2014 Innes ....................... H02P 3/12
                                                                361/24

FOREIGN PATENT DOCUMENTS

DE    10 2007 034 327 A1    1/2009
DE    10 2015 213 439 A1    1/2017
DE    10 2015 217 017 A1    3/2017

OTHER PUBLICATIONS

Search Report dated Jun. 14, 2018 for German Patent Application No. 10 2017 215 729.1, (12 pp.), note: pp. 1 and 2 are English language Explanations to Section C. Result of Determination Document.

* cited by examiner

*Primary Examiner* — Muhammad S Islam
(74) *Attorney, Agent, or Firm* — Brinks Gilson & Lione

(57) ABSTRACT

A connecting device may electrically connect an electric motor to an electronic switchgear unit. The connecting device may include a bus bar that has a first interface, a second interface, and a linear section therebetween, where the first interface is bowed in a direction at least partially transverse to a longitudinal direction of the linear section of the bus bar. The first interface may be configured to electrically connect to at least one line that conducts a drive current of the electric motor through a crimp connection, and the second interface may be configured to electrically connect to the electronic switchgear unit.

16 Claims, 18 Drawing Sheets

(51) Int. Cl.
*H02H 3/08* (2006.01)
*H02P 3/22* (2006.01)
*H02P 27/06* (2006.01)

US 10,748,720 B2

CONNECTION DEVICE AND METHOD FOR ELECTRICALLY CONNECTING AN ELECTRIC MOTOR TO AN ELECTRONIC SWITCHING UNIT, ELECTRONIC SWITCHING UNIT, CONNECTION UNIT AND DEVICE SYSTEM WITH AT LEAST ONE CONNECTION DEVICE

RELATED APPLICATION

This application claims the benefit and priority of German Patent Application DE 10 2017 215 729.1, filed Sep. 7, 2017, which is incorporated by reference herein in its entirety.

TECHNICAL FIELD

The present application relates to a connecting device and a method for electrically connecting of and electric motor to an electronic switchgear unit, an electronic switchgear unit, and a connecting unit and a device system with at least one connecting device.

BACKGROUND

Electric motors are electrically connected to a control unit, such as a control and power output electronics system, by means of numerous conducting components, such as cable lugs, copper terminal blocks and copper bolts, via numerous contacts disposed between the components.

Based on this, the present approach provides an improved connecting device and an improved method for electrically connecting an electric motor to an electronic switchgear unit, as well as an improved electronic switchgear unit and an improved connecting unit and an improved device system with at least one connecting device.

DETAILED DESCRIPTION

Figure 1:
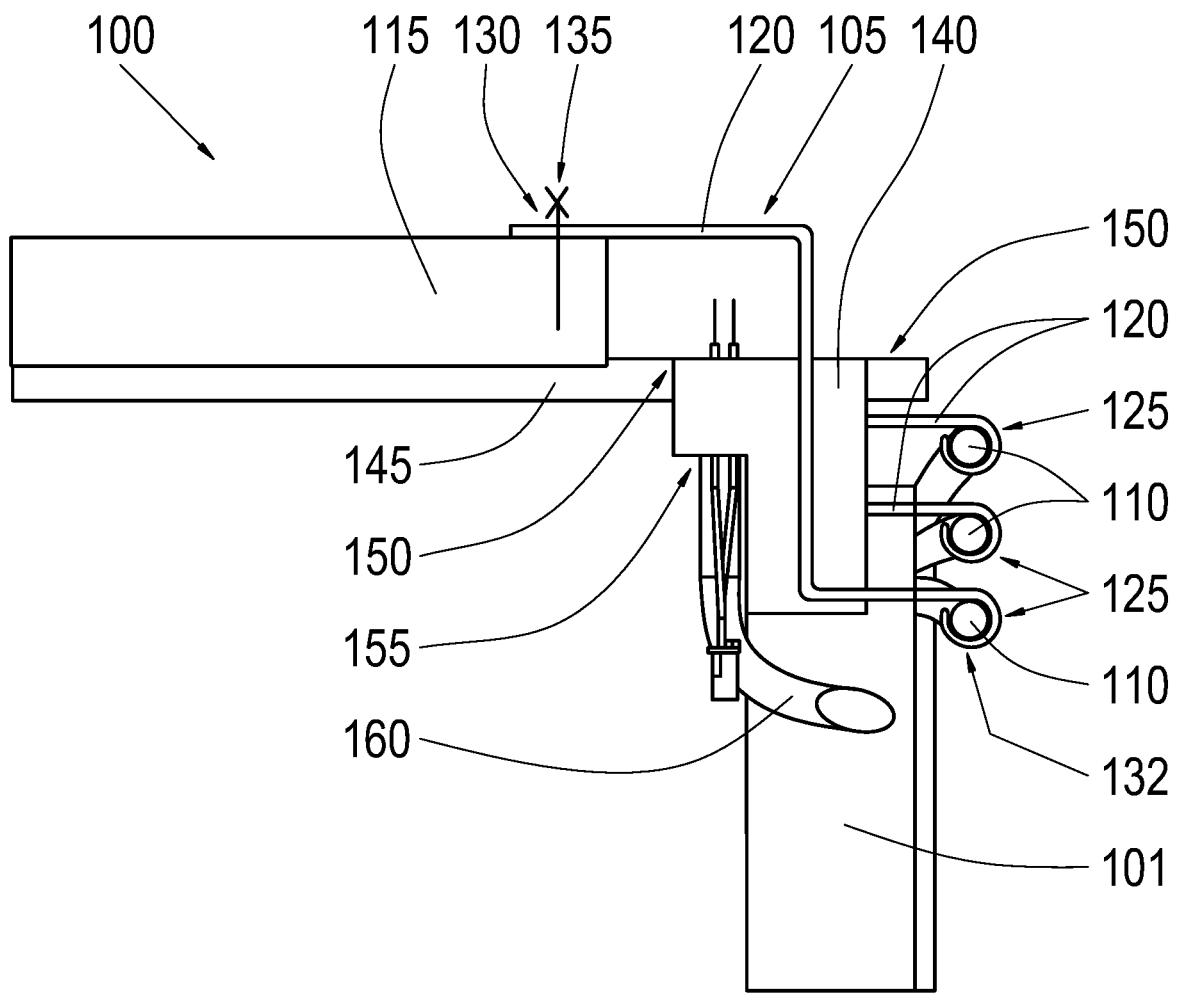
FIG. 1 shows a schematic cross section illustration of a device system according to an exemplary embodiment.

In the following description, identical or similar reference symbols shall be used for the elements depicted in the various Figures acting in similar manners, wherein there shall be no repetition of the description of these elements.

A connecting device presented herein may advantageously enable a secure and stable electrical connection of an electric motor to a control unit using only one conducting component.

A connecting device for electrically connecting of an electric motor to an electronic switchgear unit may comprise at least one linear bus bar with at least one first interface, bowed in a direction transverse to a longitudinal extension of the bus bar, and a second interface. The first interface may be designed to secure at least one line for conducting a drive current of the electric motor by means of a crimp connection. The second interface is designed to be connected to the electronic switchgear unit.

The electronic switchgear unit may be an electronic circuit, such as a printed circuit board or a power module for a control unit, e.g. a power output and/or control electronics system. The connecting device may be configured for electrically connecting of an electric motor to an electronic switchgear unit of a control unit, which are intended for use in a vehicle. The at least one line may be part of a cable for conducting the drive current, which may have an enamel coating, at least in part. Advantageously, the linear bus bar may have a rectangular cross section. The bowed first interface may be substantially circular, in order to be able to receive a section of the line in the circular first interface.

The connecting device presented herein may have very few components and very little space for electrically connecting of an electric motor to an electronic switchgear unit, and is thus inexpensive. The connecting device may be quickly and easily installed due to the small number of components For a secure connection of the connecting device to the electronic switchgear unit, the second interface may have at least one clamping unit, which may be designed to clamp onto a complementary clamping unit of the electronic switchgear unit with a clamping element. In this manner, a form-fit connection between the second interface and the electronic switchgear unit may be produced by a clamp-pin contact between the clamping unit and the complementary clamping unit. The clamping element can also fold at least partially over the clamping unit and the complementary clamping unit in the form of a separate securing element, such as a spring clip. By way of example, the clamping element can then be crimped over the clamping unit and the complementary clamping unit by means of an assembly tool, such that the clamping unit and the complementary clamping unit are clamped together and/or at least bonded.

Additionally or alternatively, the second interface may have at least one plug-in element, which is designed to be plugged into or onto a complementary plug-in element of the electronic switchgear unit. The plug-in element can represent, e.g., a free end of the bus bar, which is designed such that it may be inserted in the complementary plug-in element such that it is retained therein in a force-fit manner.

For stabilization and insulation, the connecting device may have at least one housing element in which the bus bar is or may be at least partially accommodated. The bus bar may be angled at least in part, in particular at a right angle. The housing element may be made at least in part of plastic, in particular a thermosetting material, and/or at least one housing section of the housing element may have a sealing element. The sealing element may be useful if the connecting device is to be disposed in or on a further section of the housing for the electronic switchgear unit or the electric motor. When the housing element comes in contact with the further housing unit, the sealing element can prevent an exchange of media such as oil or liquid.

It is also advantageous when the connecting device according to at least one embodiment is designed to at least partially accommodate a signal conducting unit that connects or can connect the electric motor to the electronic switchgear unit. The signal conducting unit may be at least one signal cable, for example, which transmits sensor signals from a rotor-position sensor and/or temperature sensor, and/or rotational rate sensors in the electric motor to the electronic switchgear unit. By way of example, the housing element for the connecting device may have a through-hole, or at least a recess, for accommodating the signal conducting unit, in which the signal conducting unit may be or is placed. As a result, a stable and protected receiver for the signal conducting unit is advantageously obtained. Through the integration of the signal conducting unit therein, installation space in the vehicle interior is conserved when the connecting device is disposed in the vehicle together with the electric motor and the control unit.

A connecting unit has many of the aforementioned connecting devices, designed in one of the ways described above, in particular wherein the connecting devices are mechanically connected to one another. By way of example, the connecting unit can comprise three of the connecting devices mechanically connected to one another. Such a connecting unit may be accommodated directly in a vehicle between the electric motor and the control unit for an effective use thereof, and can successfully conduct the drive current from the electric motor to the control unit.

An electronic switchgear unit, e.g. a printed circuit board or a power module for a control unit, may have at least one complementary clamping unit, which is designed to be clamped by a clamping unit of one of the aforementioned connecting devices. Additionally or alternatively, the electronic switchgear unit has a complementary clamping unit designed to be plugged into or onto a plug-in element of the connecting device. Such an electronic switchgear unit may be securely coupled in a stable manner to one of the connecting devices that has the clamping unit and/or plug-in unit described above.

A device system according to at least one embodiment may comprise at least one of the connecting devices presented herein (or another), at least one line for conducting a drive current of an electric motor, and/or at least one electronic switchgear unit. The line is attached to the first interface of the connecting device and/or the second interface of the connecting device is connected to the electronic switchgear unit. Such a device system may be disposed in a vehicle, and achieves the advantages described above through the connecting device.

The present disclosure also describes a method for electrically connecting of an electric motor to an electronic switchgear unit comprises one or more of the following steps: (1) securing at least the one line of the electric motor to the first interface of the bus bar of one of the connecting devices presented herein; and (2) connecting the second interface of the bus bar of the connecting device to the electronic switchgear unit.

The advantages of the connecting device described herein can also be quickly and easily implemented with such a method. It is advantageous when, during the securing step, the line is secured to the first interface of the bus bar through a crimping procedure, in particular a hot-crimping procedure. The crimping procedure, or the hot-crimping procedure, may ensure that the crimped components are securely and permanently connected.

In the connecting step, the second interface may be screwed to the printed circuit board or the power module using at least one screw, in order to connect the second interface in a force-fit manner to the printed circuit board or the power module.

Additionally or alternatively, a clamping unit can clamp the second interface to the electronic switchgear unit in the connecting step, using at least one clamping element and/or one clamping tool, to attach it to a complementary clamping unit in the electronic switchgear unit, in order to connect the second interface to the electronic switchgear unit.

Additionally or alternatively, a plug-in unit of the second interface may be plugged into or onto the complementary plug-in unit of the electronic switchgear unit in the connecting step, in order to connect the second interface to the electronic switchgear unit.

The method can also include a step for placing a housing section of the connecting device on a further housing section of the electronic switchgear unit or the electric motor, in particular wherein the housing section may be accommodated in the further housing section in the placement step.

Further, a computer program product containing program code may be included, which may be stored on a machine-readable medium, such as a semiconductor memory, a hard disk memory, or an optical memory, and is used for executing the method according to any of the embodiments described above, when the program is executed on a computer or a device.

Referring now to the figures, FIG. 1 shows a schematic cross section illustration of a device system 100 according to an exemplary embodiment. The device system 100 is designed to be accommodated in a vehicle and configured for conducting a drive current from an electric motor 101 of the vehicle to a control device of the vehicle, when the device system 100 is accommodated in the vehicle, as depicted herein, between the electric motor 101 and the control device.

For this, the device system 100 comprises at least one connecting device 105, at least one line 110 for conducting a drive current from the electric motor 101, and an electronic switchgear unit 115, which may be connected to the control unit, or is a part of the control unit. The electronic switchgear unit 115 is an electronic circuit according to this exemplary embodiment, such as a printed circuit board or a power module for the control unit designed as a power output and control electronics system. According to this exemplary embodiment, the device system 100 has three lines 110, which collectively form an enameled wire bundle having the phases U, V and W, and three connecting devices 105, only one of which may be seen in FIG. 1 due to the cross section illustration. The connecting devices 105 are designed to form an electrical connection between the electric motor 101 and the electronic switchgear unit 115.

Details of the connecting device 105 shall be explained below based on only one example of a connecting device 105 for purposes of clarity, wherein statements regarding the one connecting device 105 also apply to all of the other connecting devices 105 described in the subsequent Figures.

In order to create an electrical connection between the electric motor 101 and the electronic switchgear unit 115, the connecting device 105 has at least one linear bus bar 120 with at least one first interface 125 bowed transverse to a longitudinal extension of the bus bar 120, and a second interface 130.

The first interface 125 is designed to secure at least one of the lines 110 for conducting a drive current from the electric motor 101 by means of a crimp connection 132, and the second interface 130 is designed to be connected to the electronic switchgear unit 115.

According to this exemplary embodiment, each of the three lines 110 is secured to one of the three first interfaces 125 of the connecting devices 105 by means of a crimp connection 132, and each of the three second interfaces 130 is connected to the electronic switchgear unit 115 by means of a screw 135.

A cross section of the linear bus bar 120, transverse to the cross section shown herein, has a rectangular form according to this exemplary embodiment. The first interface 125 is disposed on a free end of the bus bar 120, and bowed nearly entirely around a round part of the line 110. The line 110 is received in the circular first interface 125. The second interface 130 is disposed in the region of a further free end of the bus bar 120 opposite the first free end. Except for the bowed first interface 125, the bus bar 120 is Z-shaped, wherein the two angles of the Z-shaped bus bar 120 are right angles.

The connecting device 105 according to this exemplary embodiment optionally has at least one housing element 140, which receives an L-shaped region of the Z-shaped bus bar 120. The housing element 140 is made of plastic according to this exemplary embodiment. A housing section of the housing element 140 is accommodated according to this exemplary embodiment in a further housing element 145 of the electric motor 101. The housing element 140 has a sealing element 150 according to this exemplary embodiment, which is disposed on an edge of the housing element 140, encompassing said edge, between the housing element 140 and the further housing element 145. The sealing element 150 is designed to seal the housing elements 140, 145 against one another in a contact region.

The housing element 140 also has, optionally, a through-hole 155, in which a signal conducting unit 160 is disposed, passing through the through-hole 155. The signal conducting unit 160 is designed as a shielded signal cable harness and is or may be connected at one end to the electric motor 101, and at the other end to the electronic switchgear unit 115 or another element of the control unit. According to this exemplary embodiment, the signal cable harness conducts sensor signals from a temperature sensor, a rotational rate sensor, and a rotor-position sensor in the electric motor 101.

Certain exemplary embodiments of FIG. 1 shall be explained in greater detail below.

In differing from known connecting devices, which connect a cable harness of an electric motor by means of a cable lug, which is screwed to a copper connection block and/or a copper bolt, which in turn is welded to a bus bar screwed to a power module, and which have numerous O-rings for sealing purposes, the connecting device 105 depicted herein enables a connection of the at least one line 110 to the electronic switchgear unit 115 by means of only one single conducting component, specifically the bus bar 120.

The at least one bus bar 110 leads with a rectangular cross section from the electric motor 101 of an electric machine to the electronic switchgear unit 115 of the control unit. The rectangular cross section allows for a simple electrical contact to both the electric machine as well as to the control unit, which can also be referred to as the power-output electronics system. A sealing function is obtained according to this exemplary embodiment via a plastic coating of the bus bar in the form of the housing element 140. A round, mechanically processed bolt with an O-ring may be advantageously eliminated as a result. The rectangular cross section of the bus bar 120 allows the at least one line 110 of the electric motor 101 to be connected directly to a bus bar 120 through hot-crimping, as shown herein. The bus bar 120 is screwed directly to the electronic switchgear unit 115. As a result, the number of conducting components and the number of contact points may be reduced in relation to known connecting devices.

In differing from known connecting devices, in which signal lines of a rotor-position sensor, RLS, and a temperature sensor, NTC, are guided outside the electric drive by means of sealed plugs, and into the integrated power-output electronics system, likewise via sealed plugs, the connecting device 105 presented herein integrates the signal conducting unit 160, and advantageously does not require a plug. By integrating the signal conductor in the connecting device 105, also referred to as an AC LAS, components, and production and assembly processes may be eliminated. By eliminating the two plugs, the necessary seals, and housing processing, as well as wiring outside the housing, costs may be substantially reduced.

Figure 2:
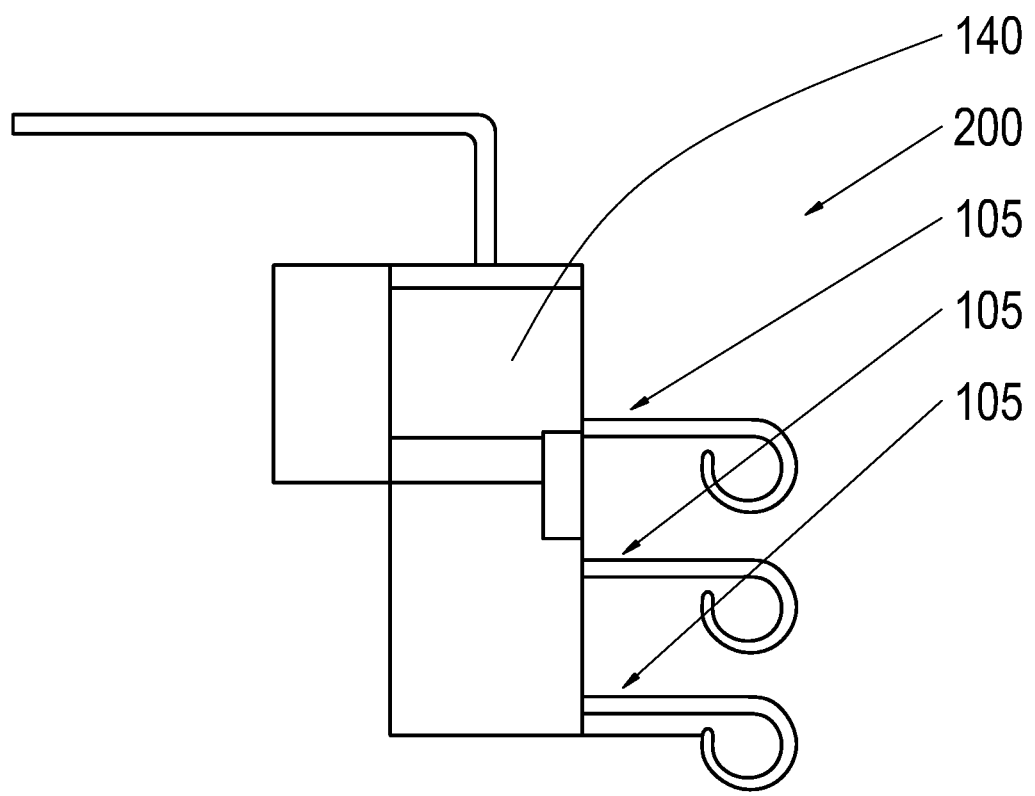
FIG. 2 shows a schematic side view of a connecting device for electrically connecting of an electric motor to an electronic switchgear unit according to an exemplary embodiment.

FIG. 2 shows a schematic side view of a connecting device 105 for electrically connecting of an electric motor to an electronic switchgear unit according to an exemplary embodiment. The connecting device 105 may be that described in reference to FIG. 1. The numerous connecting devices 105 mechanically connected to one another can also be referred to as a connecting unit 200.

Figure 3:
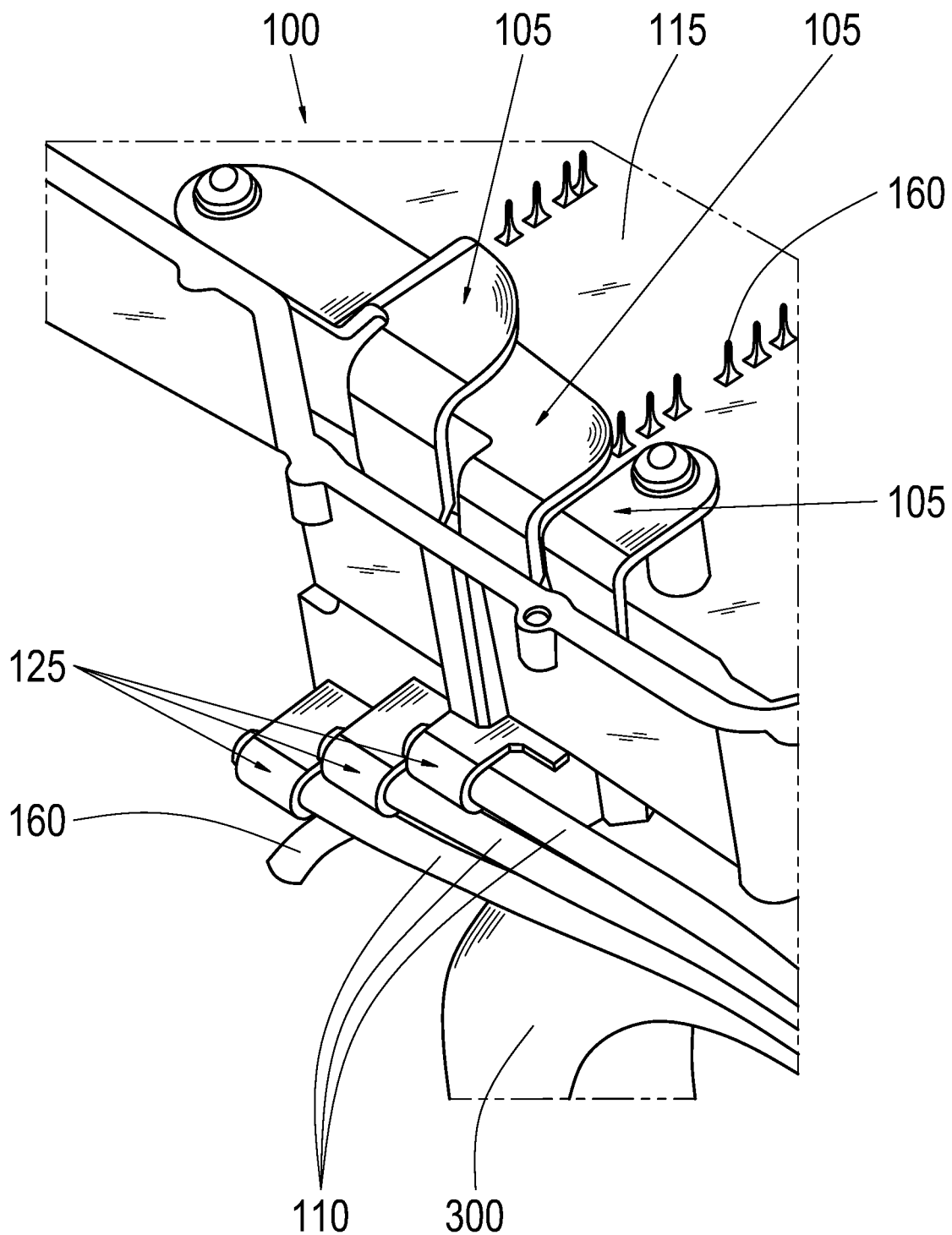
FIG. 3 shows a perspective illustration of a device system according to an exemplary embodiment.

FIG. 3 shows a perspective view of a device system 100 according to an exemplary embodiment. This may be the device system 100 described in reference to FIG. 1.

A section of a stator 300 of the electric motor can also be seen in FIG. 3, which is not a part of the device system 100.

Figure 4:
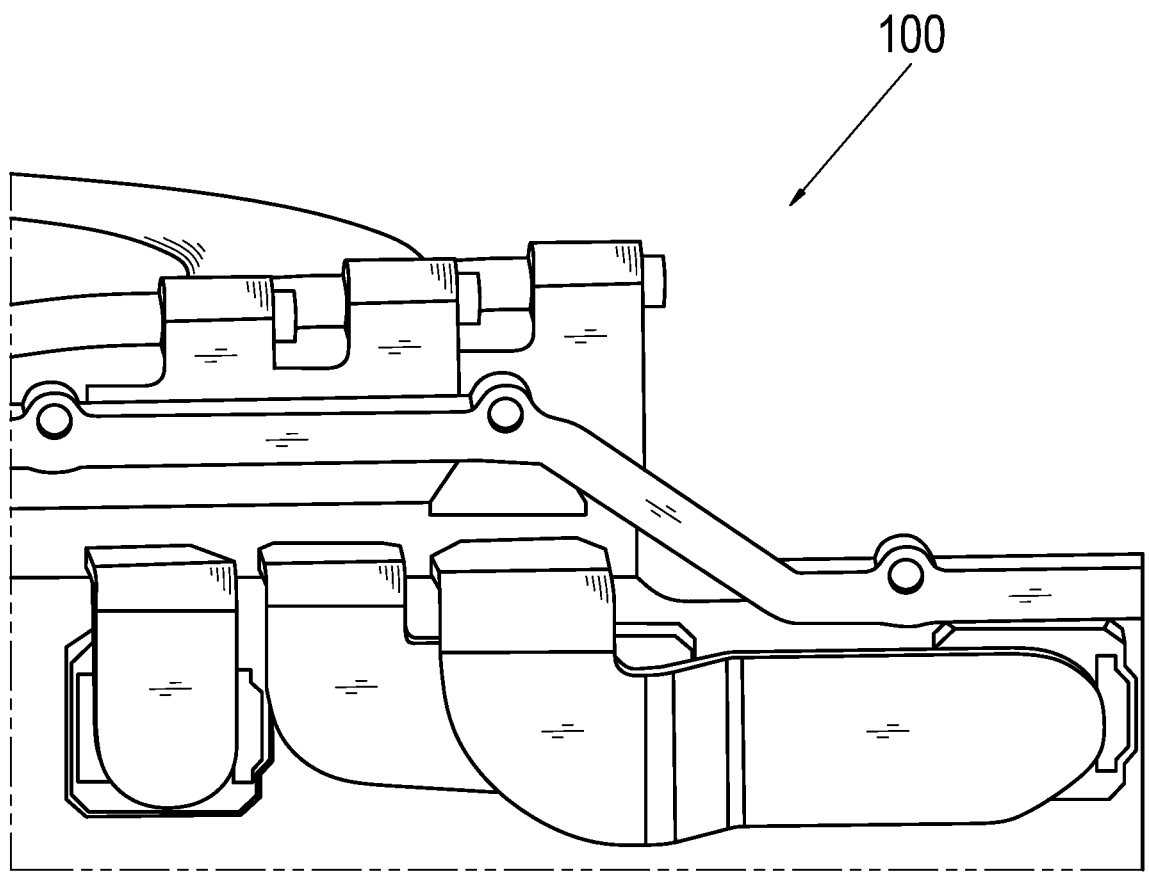
FIG. 4 shows a perspective illustration of a device system according to an exemplary embodiment.

FIG. 4 shows a steeply angled view of a device system 100 according to an exemplary embodiment. This may be the device system 100 described in reference to FIG. 1 or 3.

Figure 5:
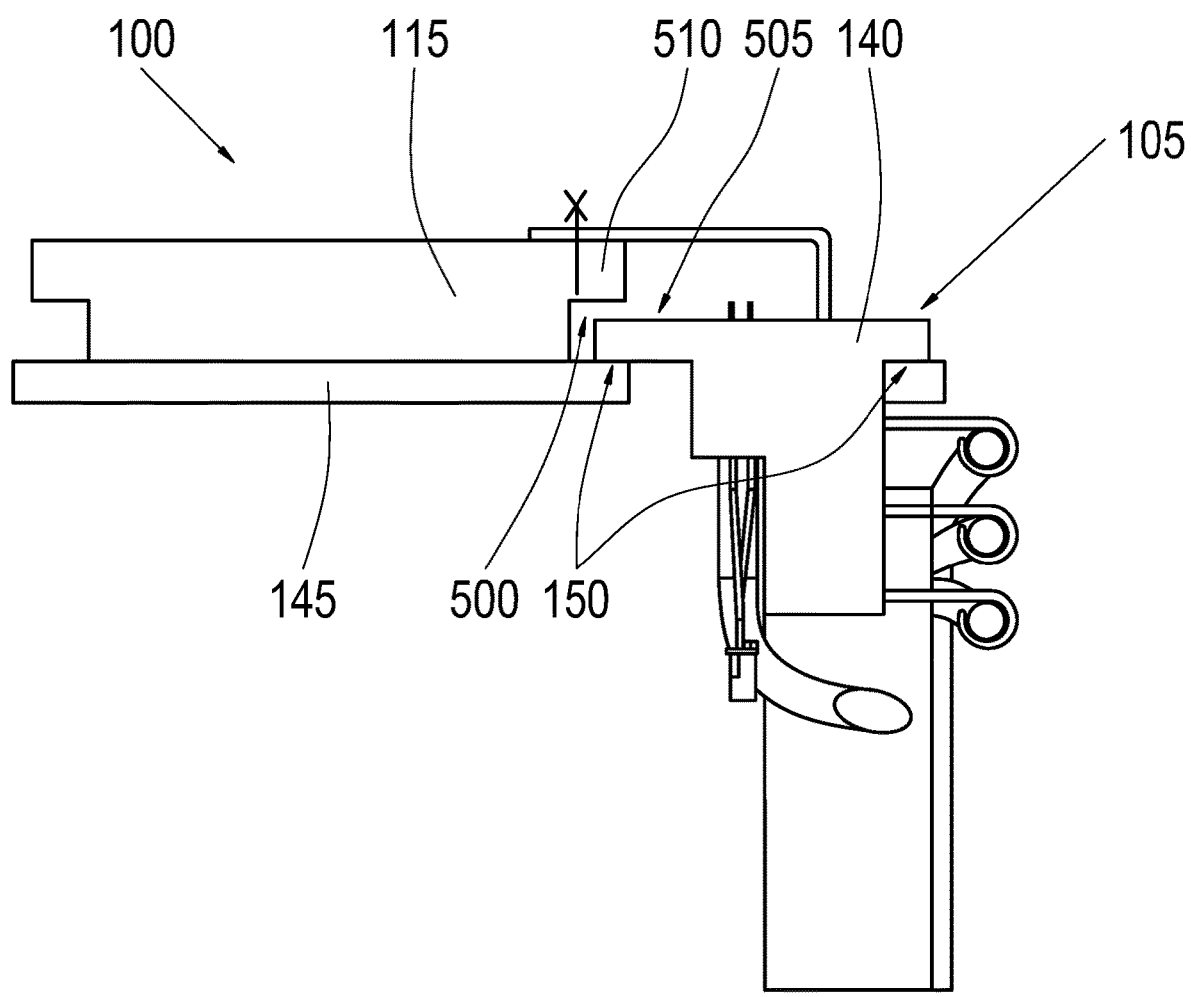
FIG. 5 shows a schematic cross section illustration of a device system according to an exemplary embodiment.

FIG. 5 shows a schematic cross section illustration of a device system 100 according to an exemplary embodiment. This may be the device system 100 described in reference to the FIG. 1, 3 or 4, with the difference that the electronic switchgear unit 115 according to this exemplary embodiment has a recess 500 facing the further housing element 145, and the housing element 140 has a flange 505.

The flange 505 of the housing element 140 bears on a side of the further housing element 145 facing the electronic switchgear unit 115 on the further housing element 145, wherein the sealing element 150 is disposed on an undersurface of the flange 505, in order to have a sealing effect on a contact surface between the housing element 140 and the further housing element 145 in the assembly shown herein. A flange region of the flange 505 facing the electronic switchgear unit 115 is received in the recess 500, thus between a lip 510 of the electronic switchgear unit 115 and the further housing element 145.

Figure 6:
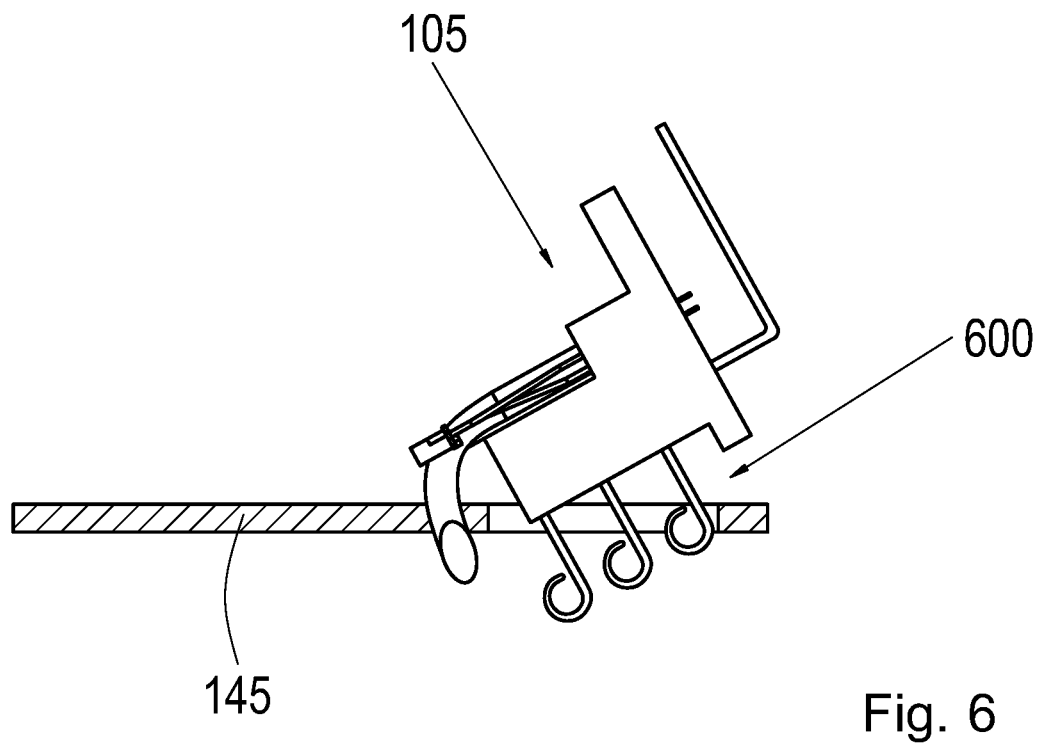
FIG. 6 shows a schematic side view of a connecting device mounted on a further housing element of an electric motor according to an exemplary embodiment.

FIG. 6 shows a schematic side view of a connecting device 105 mounted on a further housing element 145 of the electric motor according to an exemplary embodiment. These may be the connecting device 105 and the further housing element 145 described in reference to FIG. 5, when not fully assembled. According to this exemplary embodiment, it may be seen how the connecting device 105 is pivoted from above into a receiving hole 600 in the further housing element 145.

Figure 7:
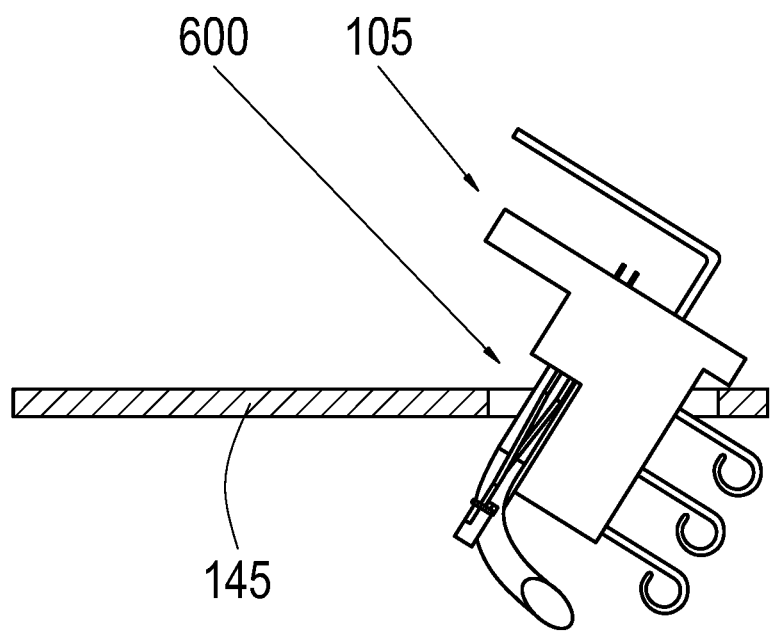
FIG. 7 shows a schematic side view of a connecting device mounted on a further housing element of an electric motor according to an exemplary embodiment.

FIG. 7 shows a schematic side view of a connecting device 105 mounted on a further housing element 145 of an electric motor according to an exemplary embodiment. These may be the connecting device 105 and the further housing element 145 described in reference to FIG. 6, wherein the connecting device 105 in FIG. 7 is also pivoted into the further housing element 145, and thus nearly entirely installed in the further housing element 145.

Figure 8:
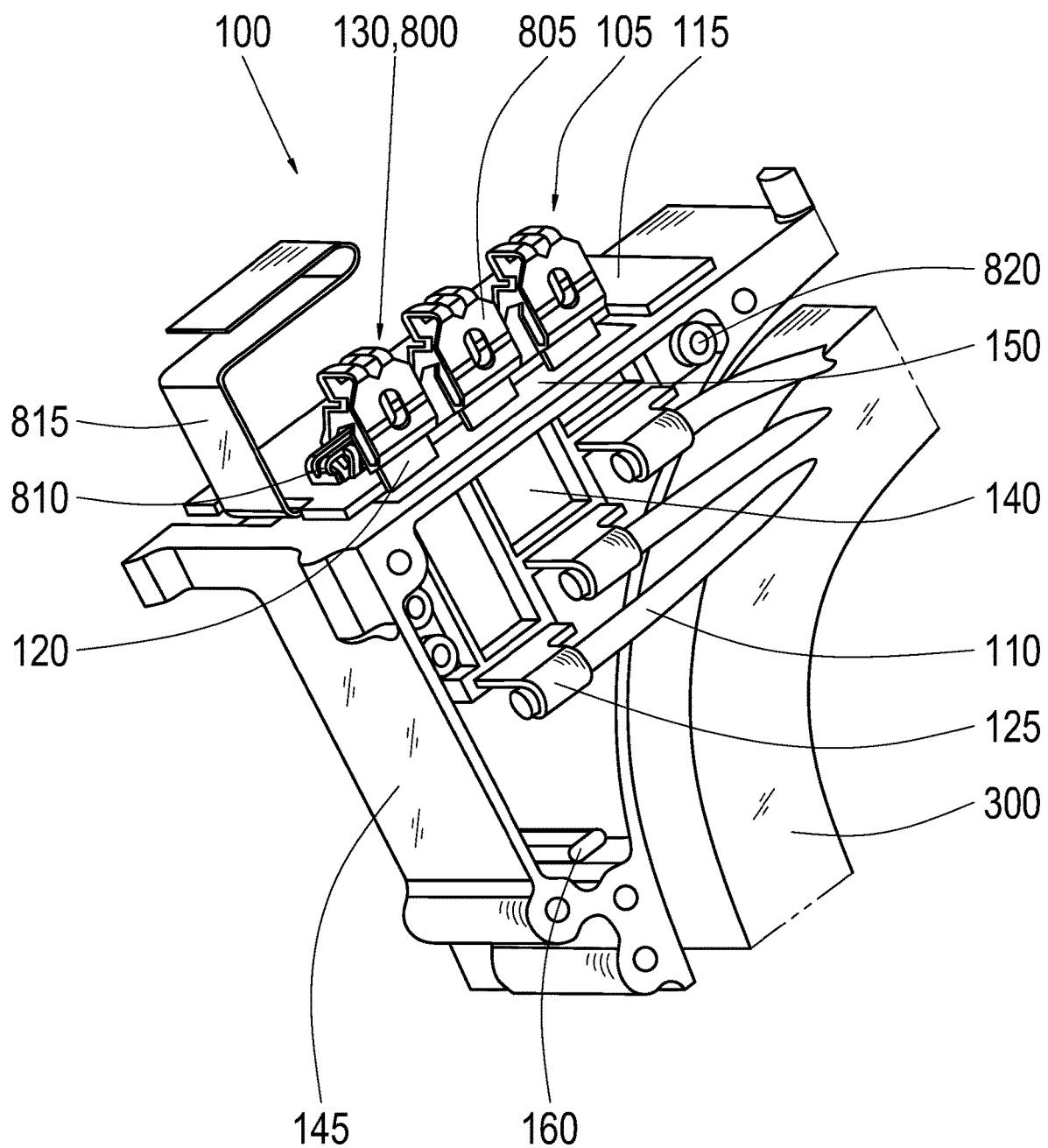
FIG. 8 shows a perspective side view of a device system according to an exemplary embodiment.

FIG. 8 shows a perspective side view of a device system 100 according to an exemplary embodiment. This may be the device system 100 described in reference to FIG. 1, 3, 4 or 5, with the difference that the connecting device 105 according to this exemplary embodiment is not secured by screws to the electronic switchgear unit 115, but instead by means of a clamping unit 800.

The bus bar 120 is L-shaped according to this exemplary embodiment, with the exception of the bowed first interface 125. The two legs of the L-shaped part of the bus bar 120 meet at a right angle.

Figure 10:
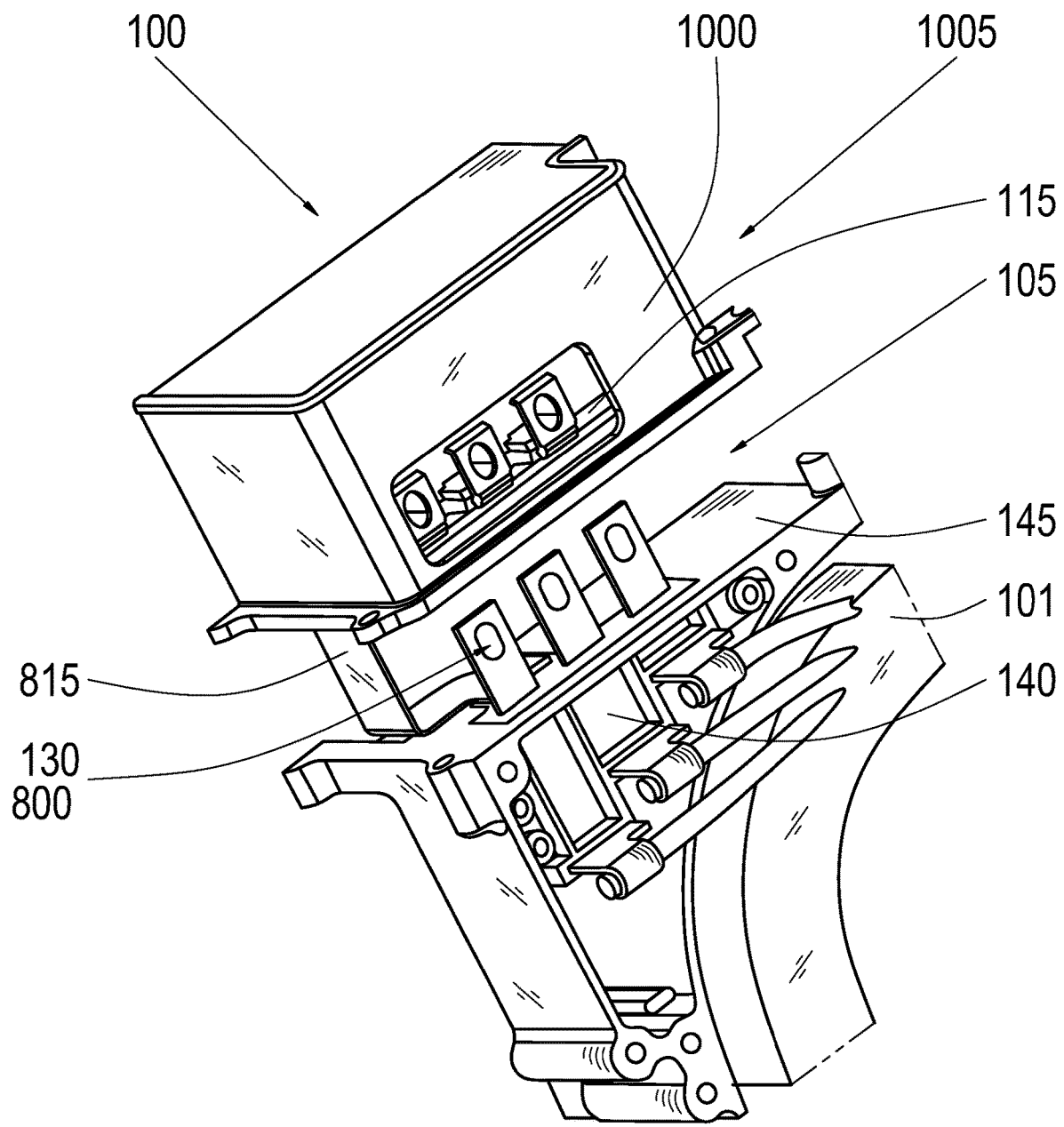
FIG. 10 shows a perspective side view of a device system according to an exemplary embodiment.

The second interface, which is covered in FIG. 8 by a clamping element 805, but may be readily seen in FIG. 10, has at least one clamping unit 800 according to this exemplary embodiment, which is clamped by the clamping element 805 to a complementary clamping unit 810 on the electronic switchgear unit 115. For this, the clamping element 805 is folded over a free end of the complementary clamping unit 810 and over the clamping unit 800. The clamping element 805 is designed as a spring clip according to this exemplary embodiment.

A ribbon cable 815 of the electronic switchgear unit 115 or the control unit is also shown in FIG. 8. The ribbon cable 815 is unshielded, connected to the signal conducting unit 160, and disposed in part between the electronic switchgear unit 115 and the further housing element 145. The ribbon cable 815 is in the form of a flexible foil according to an alternative exemplary embodiment. The housing element 140 is screwed into the further housing element 145 by means of numerous screws 820 according to this exemplary embodiment. The sealing element 150 is a rubber stopper according to this exemplary embodiment, which is inserted into the further housing element 145. The bus bar 120 passes through the sealing element 150.

Certain exemplary embodiments of FIG. 8 shall be explained in greater detail below.

The device system 100 presented herein is distinguished in that the at least one line 110, wherein numerous lines 110 can also be referred to as a harness, is connected directly to the bus bar 120, e.g. through hot crimping, as shown here. Furthermore, the bus bar 120 is connected directly to the high amperage printed circuit board in the form of the electronic switchgear unit 115 via a clamp-pin contact, in this case a PowerClamp contact, or via a plug-in contact, as shown in FIGS. 13 to 17, e.g. an SEC contact. Moreover, the AC high amperage connection in the form of the device system 100 according to this exemplary embodiment has an integrated signal current conductor, which is obtained through the integrated signal conducting unit 160.

In differing from known device systems, the device system 100 presented herein enables a quick and simple implementation of a high amperage connection between the electric motor and the control unit. Space requirements, and component and assembly costs are low with the device system 100 presented herein.

Furthermore, the conducting components may be produced inexpensively with stamping, bending and pressing processes, without tensioning processes, and can also be mass produced. Conducting components are connected according to this exemplary embodiment without screws. As a result, and due to the low number of contact points, assembly is also simple. By integrating the signal current guides in the AC high amperage connection, the number of components, and production and assembly processes may be reduced in comparison with known solutions.

The bus bar 12 is connected according to this exemplary embodiment directly to the complementary clamping unit 810, which can also be referred to as a printed circuit board contact, via a clamp-pin contact. A media seal against oil, moisture, etc. is obtained between the further housing element 145 and the housing element 140 according to this exemplary embodiment by a sealing element 150, which is an elastomer seal, in this case in the form of a rubber stopper. According to an alternative exemplary embodiment, the media seal is obtained by means of a sealing element formed by a casting compound, such as adhesive.

The three bus bars 120 are coated with plastic according to this exemplary embodiment, in this case a thermoset plastic. According to an alternative exemplary embodiment, the bus bars 120 are placed between at least two plastic housing parts. The bus bars 120 with the plastic insulation are inserted at the ends into the further housing element 145 according to this exemplary embodiment, and attached with three further screws 820.

One advantage of the connecting device 105 is that a power-output and control electronics system of a vehicle drive may be robustly and inexpensively connected to the cable harnesses of a stator 300 in the electric motor.

Figure 9:
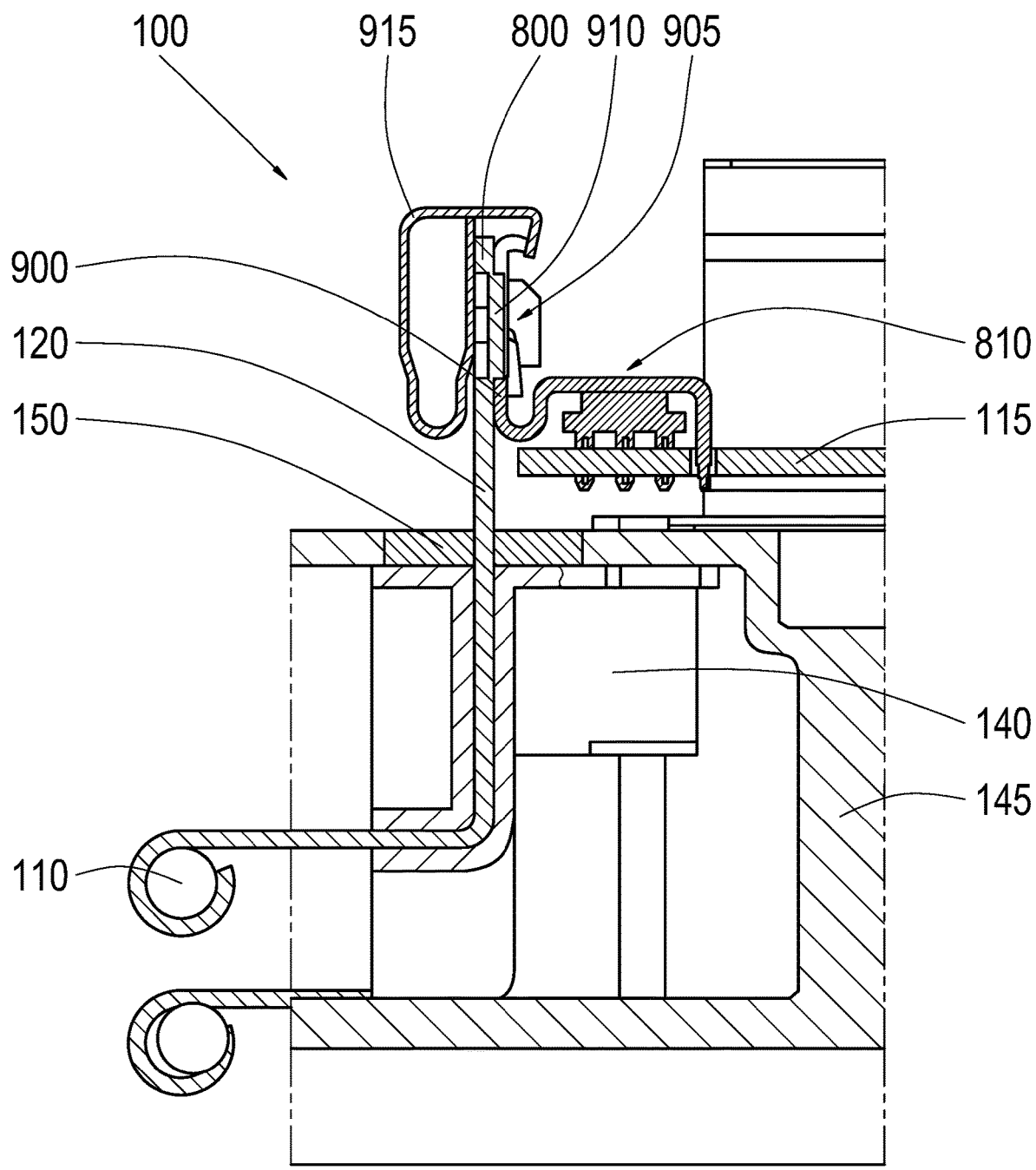
FIG. 9 shows a lateral cross section illustration of a device system according to an exemplary embodiment.

FIG. 9 shows a lateral cross section illustration of a device system 100 according to an exemplary embodiment. This may be the device system 100 described in reference to FIG. 8. A projection 910 of the clamping unit 800 is received in a complementary clamping unit hole 905 disposed in the free end 900 of the complementary clamping unit 810 according to this exemplary embodiment. A connection shown here between the bus bar 120 and the electronic switchgear unit 115 can also be referred to as a clamp-pin contact or a PowerClamp connection. The spring clip 915 clamps the clamping unit 800 and the free end 900 of the linear complementary clamping unit 810 together. The complementary clamping unit 810 can also be referred to as a press-in contact.

FIG. 10 shows a perspective side view of a device system 100 according to an exemplary embodiment. This may be the device system 100 described in reference to FIG. 9, with the difference that the electronic switchgear unit 115 according to this exemplary embodiment is not connected to the connecting device 105. The electronic switchgear unit 115 is disposed in a control housing 1000 of the control unit 1005 according to this exemplary embodiment.

The control unit 1005 is shown here mounted on the electric motor 101 with a clamp-pin contact. First, the ribbon cable 815 of the control unit 1005 is connected to the connecting device 105 with an integrated signal current passage. The control housing 1000 is then placed on the further housing element 145, as shown in FIG. 11.

Figure 11:
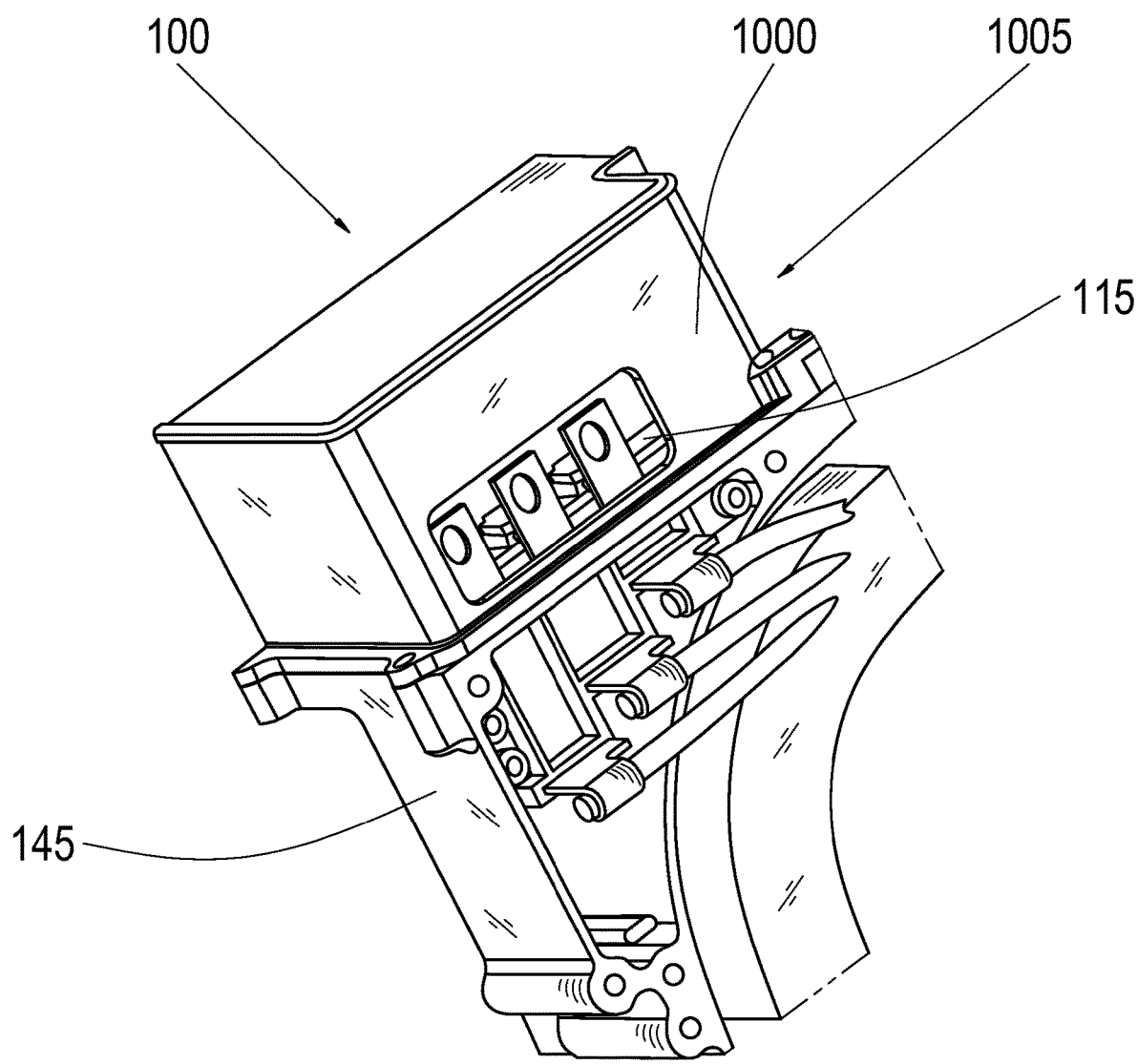
FIGS. 11 to 13 show a perspective side view of a device system according to an exemplary embodiment.

FIG. 11 shows a perspective side view of a device system 100 according to an exemplary embodiment. This may be the device system 100 described in reference to FIG. 10, with the difference that the electronic switchgear unit 115 according to this exemplary embodiment is connected to the connecting device. For this, the clamping unit and the complementary clamping unit are connected to one another. The control housing 1000 is placed on the further housing element 145 according to this exemplary embodiment. The clamping element is not yet installed according to this exemplary embodiment.

Figure 12:
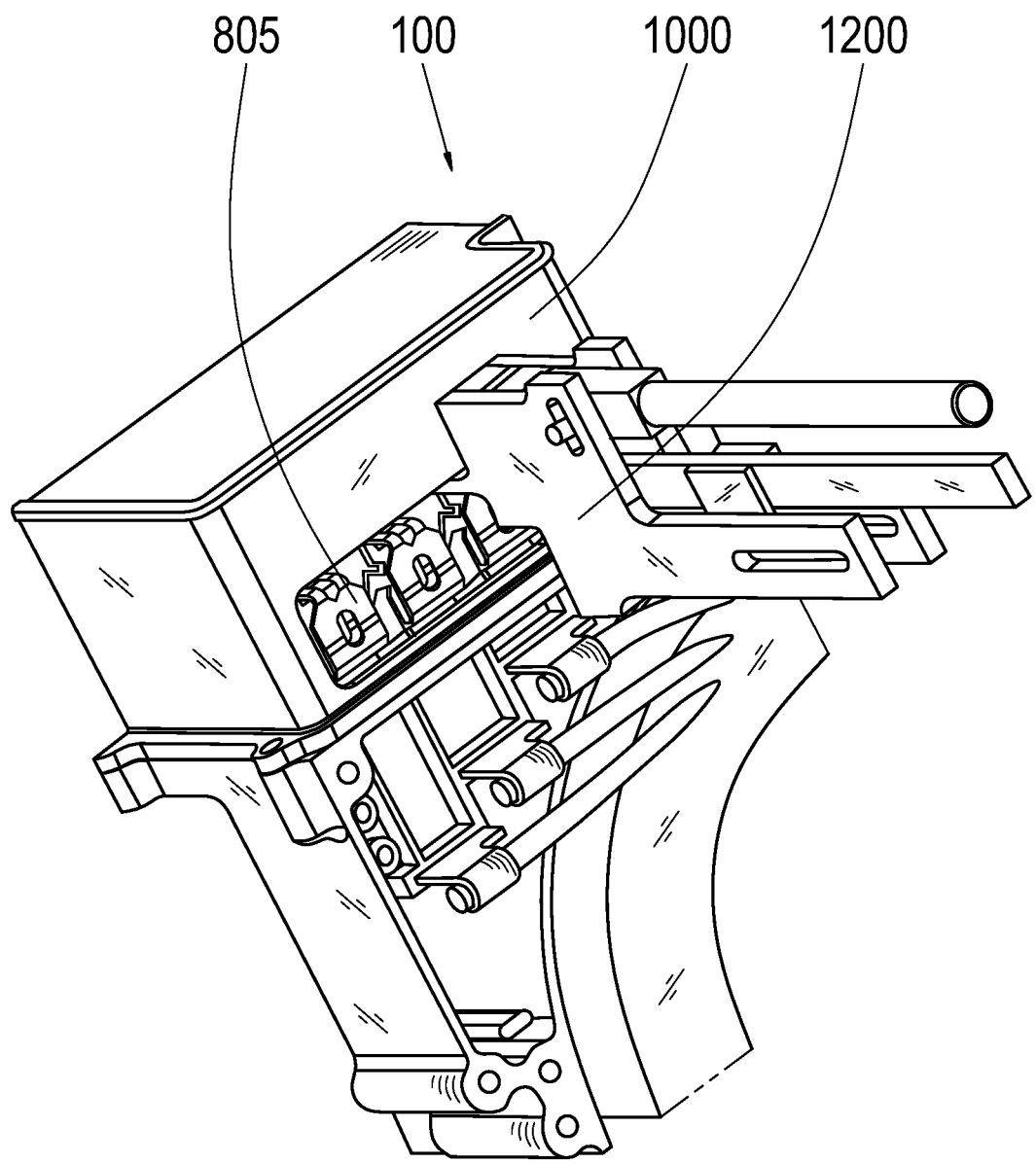

FIG. 12 shows a perspective side view of a device system 100 according to an exemplary embodiment. This may be the device system 100 described in reference to FIG. 11, with the difference that the clamping element 805 is attached to the clamping unit and the complementary clamping unit by an assembly tool 1200. The clamping element 804 is inserted through a hole in the control housing to connect the bus bar to the complementary clamping unit with an assembly tool 1200.

The clamp-pin contact shown here is robust and increases the service life of the connection. Furthermore, a larger, continuous line cross section is depicted. In this manner, losses may be reduced and/or higher amperages may be used.

Figure 13:
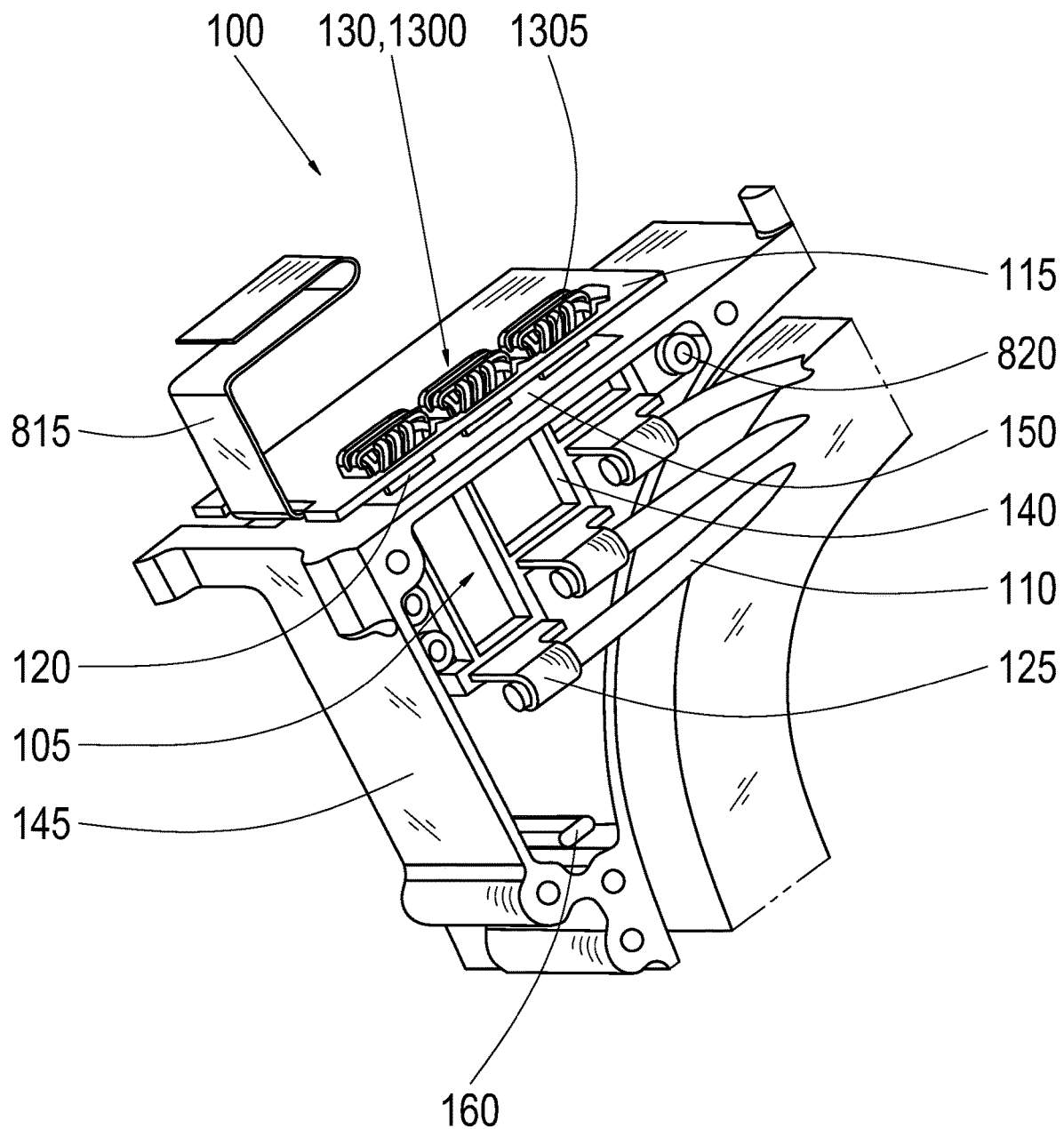

FIG. 13 shows a perspective side view of a device system 100 according to an exemplary embodiment. This may be the device system 100 described in reference to FIG. 8, with the difference that the second interface 130 of the connecting device 105 according to this exemplary embodiment has a plug-in unit 1300 instead of a clamping unit, and the electronic switchgear unit 115 has a complementary plug-in unit 1305 instead of a complementary clamping unit. The plug-in unit 1300 is plugged into the complementary plug-in unit 1305 in order to connect the connecting device 105 to the electronic switchgear unit 115.

Figure 14:
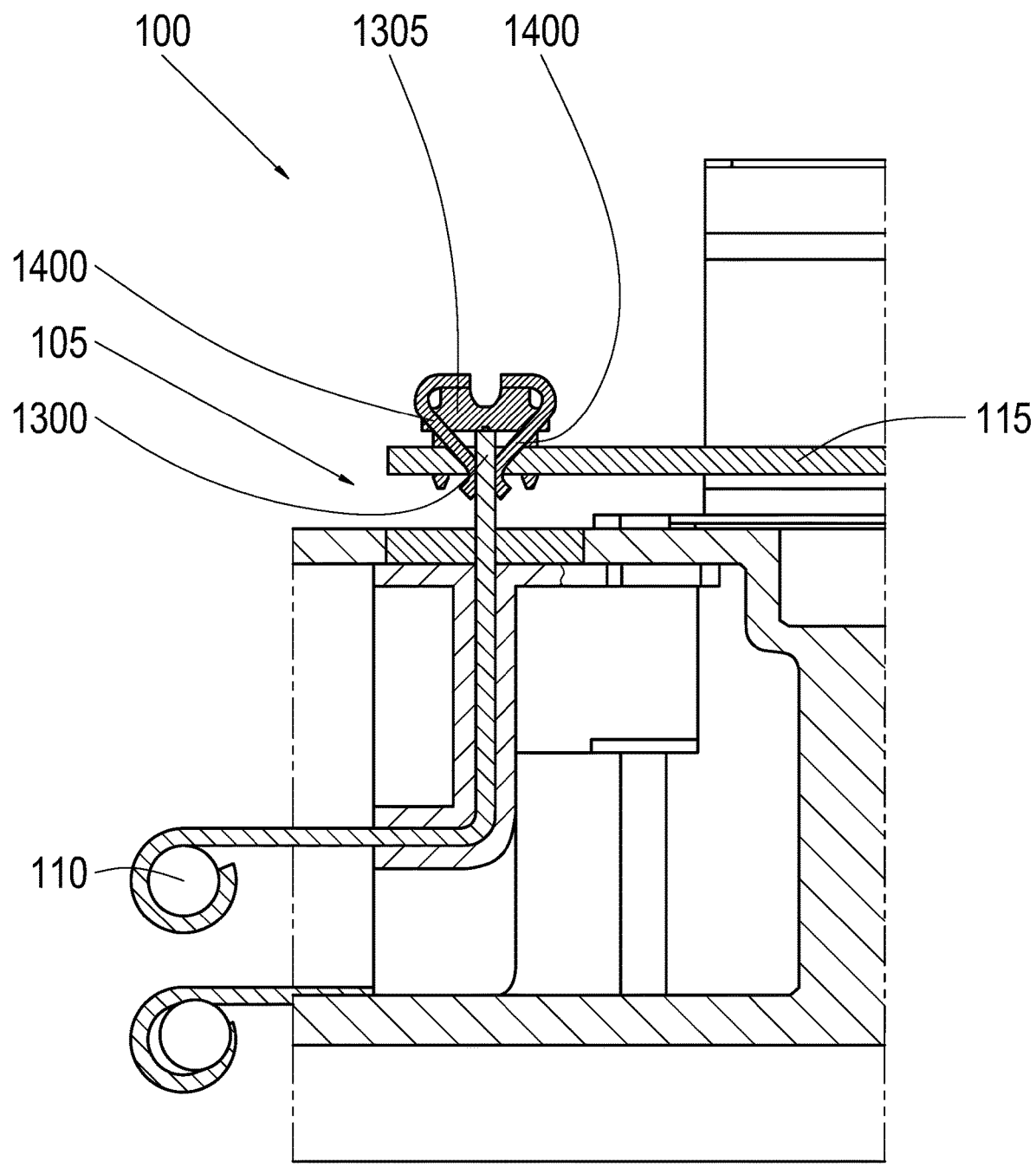
FIG. 14 shows a lateral cross section illustration of a device system according to an exemplary embodiment.

FIG. 14 shows a lateral cross section illustration of a device system 100 according to an exemplary embodiment. This may be the device system 100 described in reference to FIG. 13. It may be seen in FIG. 14 that the plug-in unit 1300 is inserted between multiple plug-in legs 1400 on the complementary plug-in unit 1305, and thus retained in the complementary plug-in unit 1305 in a force-fitting manner.

Figure 15:
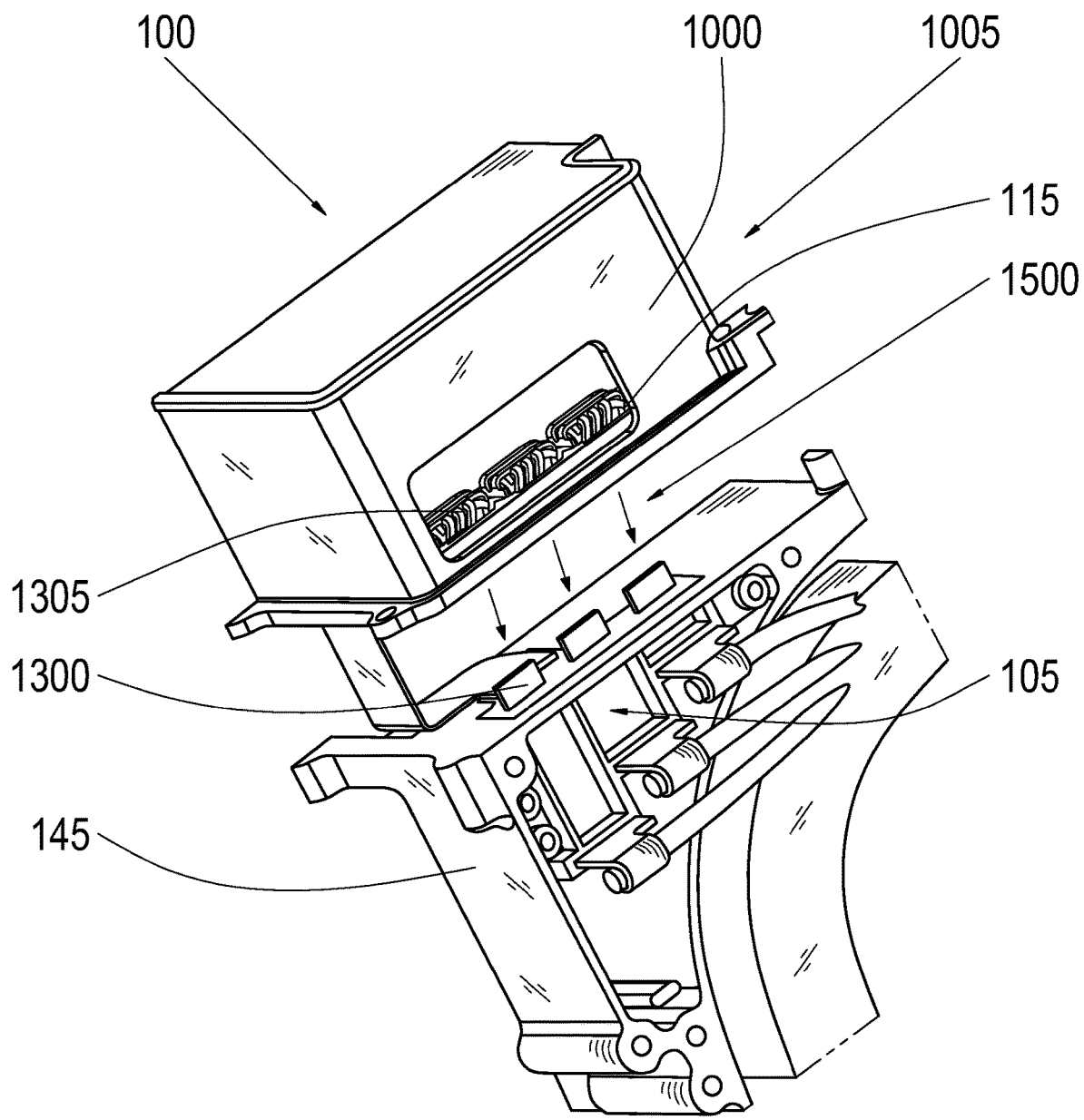
FIG. 15 shows a perspective side view of a device system according to an exemplary embodiment.

FIG. 15 shows a perspective side view of a device system 100 according to an exemplary embodiment. This may be the device system 100 described in reference to FIG. 14, with the difference that the electronic switchgear unit 115 is not connected to the connecting device 105 according to this exemplary embodiment. The electronic switchgear unit 115 is disposed in a control housing 1000 of the control unit 1005 according to this exemplary embodiment. The control unit 1005 may be mounted on the connecting device 105 by means of a blind mount 1500.

The control unit 1005 is mounted via a plug-in contact in FIG. 15. Here as well, the ribbon cable of the control unit 1005 is connected in a first step to the connecting device 105 with the integrated signal current passage. The control housing 1000 is then plugged to the further housing element 145 via a so-called blind mount. In this case, the printed circuit board contact takes the form of the complementary plug-in unit 1305 with opposing prongs, referred to as the plug-in legs in reference to FIG. 14. The three bus bars are thus pressed directly into these prongs in the complementary plug-in unit 1305 when the two housing parts 145, 1000 are placed thereon. The electrical connection is obtained in this manner.

Because of the low number of components in the plug-in contact depicted herein, the material costs are low. The assembly process is quick and simple, and may be carried out advantageously without tools.

Figure 16:
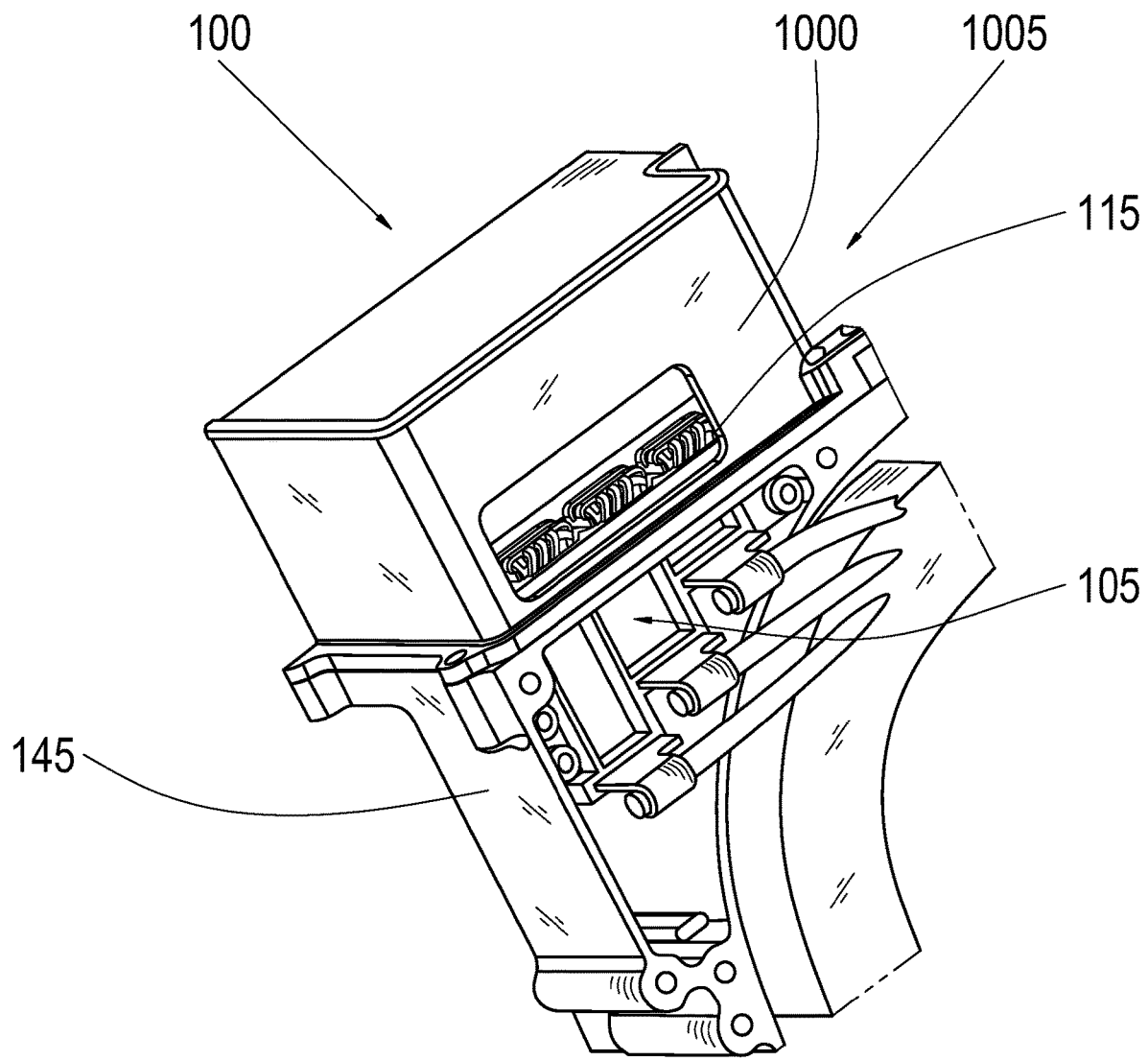
FIG. 16 shows a perspective side view of a device system according to an exemplary embodiment.

FIG. 16 shows a perspective side view of a device system 100 according to an exemplary embodiment. This may be the device system 100 described in reference to FIG. 15, with the difference that the electronic switchgear unit 115 is connected to the connecting device 105 according to this exemplary embodiment. For this, the plug-in unit and the complementary plug-in unit are connected to one another by means of a blind mount. The control housing 1000 is placed on the further housing element 145 according to this exemplary embodiment.

Figure 17:
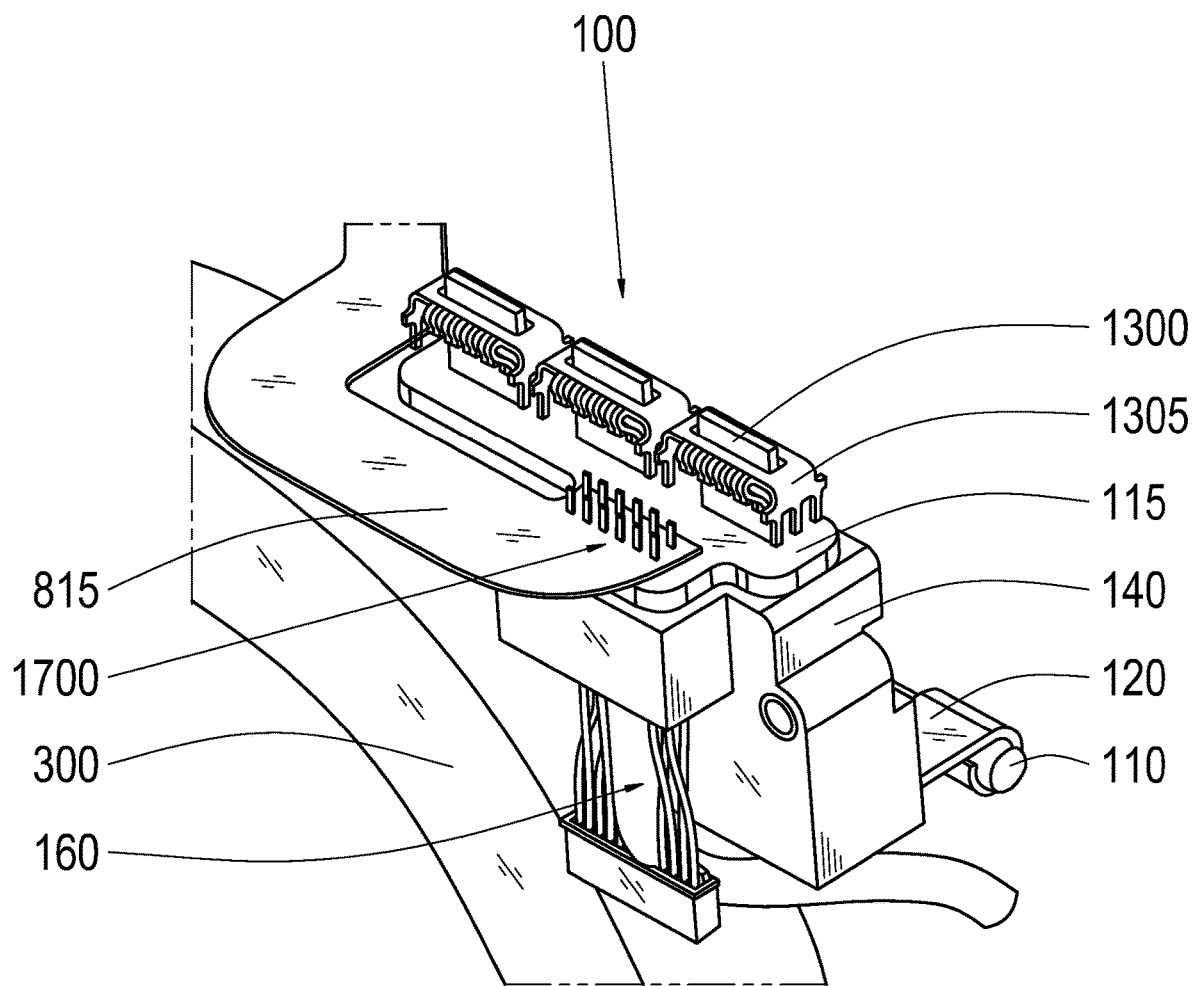
FIG. 17 shows a perspective view of a device system according to an exemplary embodiment.

FIG. 17 shows a perspective view of a device system 100 according to an exemplary embodiment. This may be the device system 100 described in reference to any of the FIG. 13, 14 or 16. A signal interface 1700 between the signal conducting unit 160 and the ribbon cable 815 can also be seen in FIG. 17.

Figure 18:
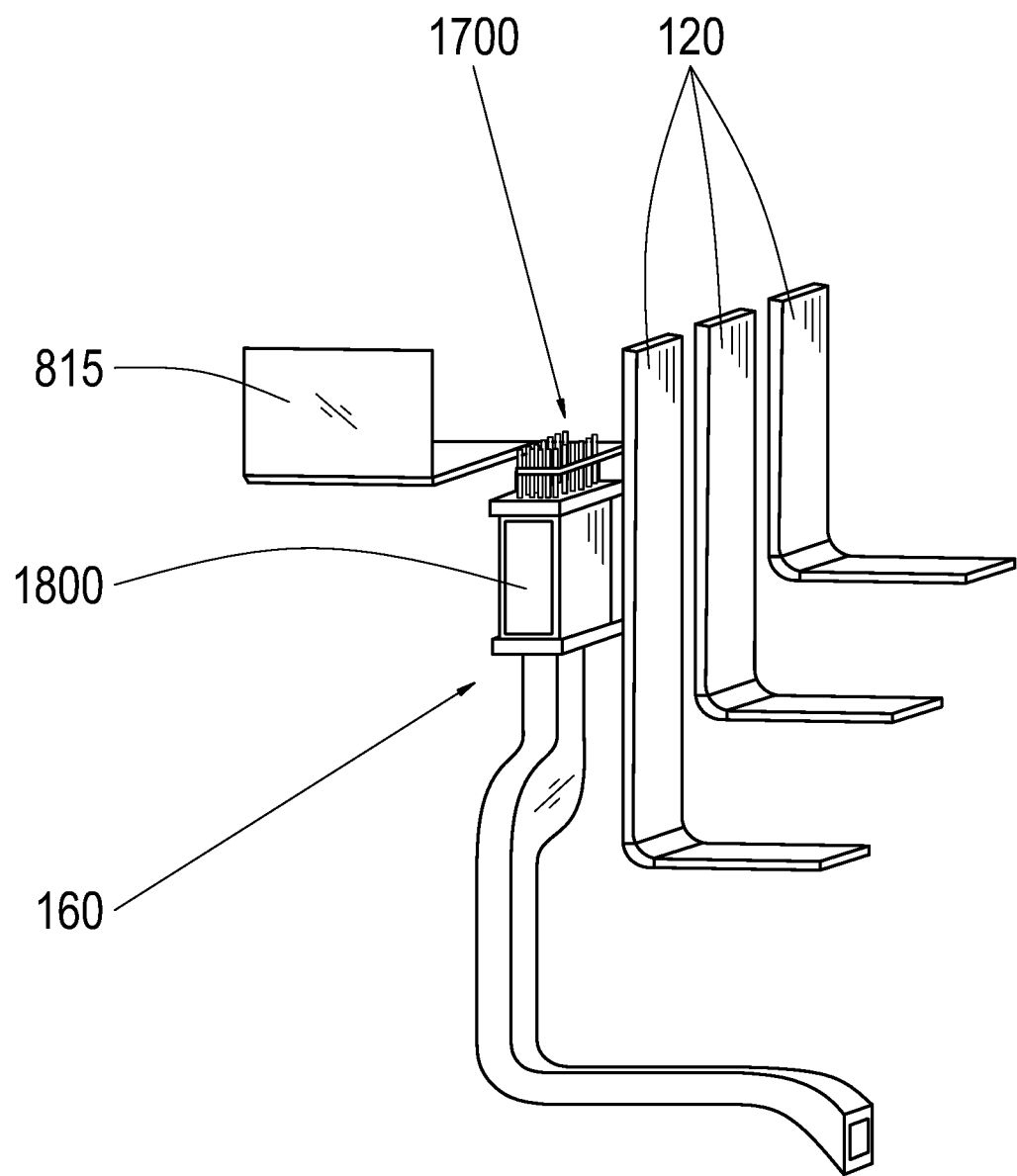
FIG. 18 shows a schematic side view of a signal interface according to an exemplary embodiment.

FIG. 18 shows a schematic side view of a signal interface 1700 according to an exemplary embodiment. This may be the signal interface 1700 described in reference to FIG. 17. A plug 1800 is disposed on one end of the signal conducting unit 160 according to this exemplary embodiment, which is inserted directly into the ribbon cable 815.

Figure 19:
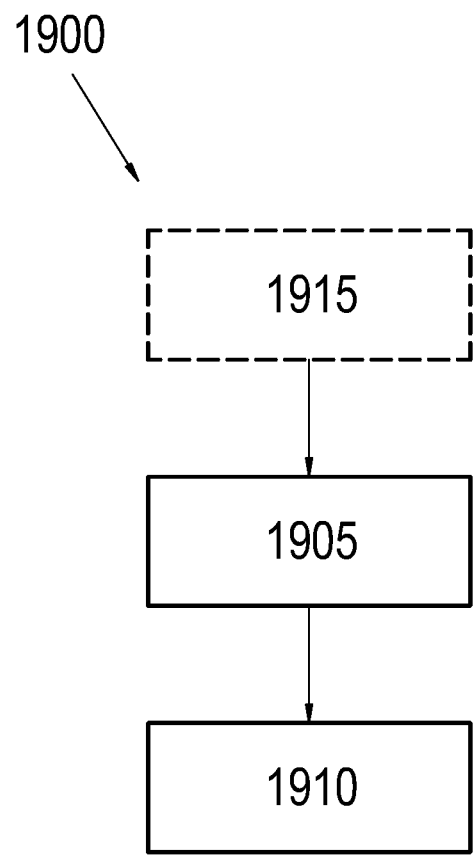
FIG. 19 shows a flow chart for a method for electrically connecting of an electric motor to an electronic switchgear unit according to an exemplary embodiment.

FIG. 19 shows a flow chart for a method 1900 for an electrical contact between an electric motor and an electronic switchgear unit according to an exemplary embodiment. This may be a method 1900 that may be executed using any of the connecting devices described in reference to any of the Figures.

The method 1900 has a least one step 1905 for securing and one step 1910 for connecting. In the securing step 1905, at least one line of the electric motor is secured to the first interface of the bus bar of the connecting device. The second interface of the bus bar of the connecting device is connected to the electronic switchgear unit in the connecting step 1910.

According to this exemplary embodiment, the line is secured to the first interface of the bus bar in the securing step 1905 through a crimping procedure, in particular a hot-crimping procedure. The bus bar is bundled, joined and hot-crimped with a tool according to this exemplary embodiment. The enamel wire coating on the line is vaporized and vacuumed off in the hot-crimping procedure. According to an alternative exemplary embodiment, the hot-crimping procedure is carried out in conjunction with a brazing procedure in the securing step 1905.

According to this exemplary embodiment, a clamping unit on the second interface is clamped to a complementary clamping unit of the electronic switchgear unit using at least one clamping element, in order to connect the second interface to the electronic switchgear unit. According to this exemplary embodiment, the bus bar is joined to the complementary clamping unit, which can also be referred to as a printed circuit board contact, and the clamping element is attached with a tool. The complementary clamping unit is pressed into holes in the electronic switchgear unit with a tool according to this exemplary embodiment.

According to an alternative exemplary embodiment, a plug-in unit in the second interface is additionally or alternatively inserted into or onto a complementary plug-in unit in the electronic switchgear unit in the connecting step 1910, in order to connect the second interface to the electronic switchgear unit. The complementary plug-in unit with opposing spring prongs is plugged onto the bus bar according to the alternative exemplary embodiment. This procedure can also be referred to as a blind mounting. The complementary plug-in unit is pressed into holes in the electronic switchgear unit with a tool according to this alternative embodiment.

The method 1900 optionally has a placement step 1915, in which at least one housing section of the connecting device is placed on a further housing section of the electronic switchgear unit and/or the electric motor. According to this exemplary embodiment, the housing section is received in the further housing section of the electric motor in the placement step 1915.

The exemplary embodiments described herein and shown in the Figures have been selected merely by way of example. Different exemplary embodiments may be combined with one another in their entirety or with respect to individual features. An exemplary embodiment can also be supplemented by features of a further exemplary embodiment.

Furthermore, the method steps presented herein may be repeated or carried out in a different sequence than that described.

If an exemplary embodiment comprises an "and/or" conjunction between a first feature and a second feature, this may be read to mean that the exemplary embodiment according to one embodiment comprises both the first feature and the second feature, and according to a further embodiment, comprises either just the first feature or just the second feature.

REFERENCE SYMBOLS

100 device system
101 electric motor
105 connecting device
110 line
115 electronic switchgear unit
120 bus bar
125 first interface
130 second interface
132 crimp connection
135 screw
140 housing element
145 further housing element
150 sealing element
155 through hole
160 signal conducting unit
200 connecting unit
300 stator
500 recess
505 flange
510 lip
600 receiving hole
800 clamping unit
805 clamping element
810 complementary clamping unit
815 ribbon cable
820 further screw
900 fee end
905 complementary clamping hole
910 projection
915 spring
1000 control housing
1005 control unit
1200 assembly tool
1300 plug-in unit
1305 complementary plug-in unit
1400 plug-in leg
1500 blind mount

1700 signal interface
1800 plug method for creating an electrical connection between an electric motor and an electronic switchgear unit
1905 securing step
1910 connecting step
1915 placement step

We claim:

1. A connecting device for electrically connecting an electric motor to an electronic switchgear unit, the connecting device comprising:
   a bus bar that has a first interface, a second interface, and a section therebetween,
   wherein the first interface is bowed in a direction at least partially transverse to a longitudinal direction of the section of the bus bar,
   wherein the first interface is configured to electrically connect to at least one line that conducts a drive current of the electric motor through a crimp connection formed by the bowed portion of the first interface, and
   wherein the second interface is configured to electrically connect to the electronic switchgear unit.

2. The connecting device of claim 1, wherein the second interface has at least one clamping unit for clamping to a complementary clamping unit of the electronic switchgear unit.

3. The connecting device of claim 1, wherein the second interface has at least one plug-in unit for plugging into or onto a complementary plug-in unit of the electronic switchgear unit.

4. The connecting device of claim 1, wherein the first interface includes a curved portion at least partially surrounding the at least one line to form the crimp connection.

5. An electronic switchgear unit that has at least one complementary clamping unit for clamping to a clamping unit of the second interface of the connecting device of claim 1.

6. An electronic switchgear unit that has at least one complementary plug-in unit for plugging into or onto a plug-in unit on the second interface of the connecting device of claim 1.

7. A system comprising:
   a connecting device according to claim 1; and
   at least one line for conducting a drive current of an electric motor and/or at least one electronic switchgear unit.

8. The connecting device of claim 1, wherein the bus bar consists of a z-shaped portion and the bowed portion of the first interface.

9. The connecting device of claim 4, further comprising a housing unit, wherein the bus bar is received by the housing unit, wherein housing unit receives an L-shaped portion of the bus bar.

10. The connecting device of claim 4, further comprising a housing unit, wherein the bus bar is received by the housing unit, wherein the housing unit at least partially formed of a thermoset plastic.

11. The connecting device of claim 4, further comprising a housing unit, wherein the bus bar is received by the housing unit, wherein the housing unit includes a sealing element for, wherein the bus bar passes through the sealing element, and wherein the sealing element substantially prevents fluid communication between opposite side of the sealing element.

12. The connecting device of claim 4, further comprising a housing unit, wherein the bus bar is received by the housing unit, wherein the housing unit includes through-hole configured for receiving a signal conducting unit that connects the electric motor to the electronic switchgear unit.

13. The system of claim 7, wherein the line is secured to the first interface of the connecting device.

14. The system of claim 7, wherein the second interface of the connecting device is connected to the electronic switchgear unit.

15. A connecting device, comprising:
a bus bar with a first interface, a second interface, and at least one section located between the first interface and the second interface,
wherein the first interface is electrically connected to a line conducting a drive current that controls an electric motor,
wherein the second interface is electrically connected to a switchgear unit, and
wherein the first interface extends from a z-shaped portion of the bus bar, and
wherein the first interface is bowed in a direction at least partially transverse to a longitudinal direction of the section of the bus bar such that the first interface at least partially surrounds the line.

16. The connecting device of claim 15, wherein the second interface is electrically connected to the switchgear unit via at least one of a clamping unit and a plug.

* * * * *